United States Patent Office 3,428,596
Patented Feb. 18, 1969

3,428,596
RUBBER COMPOSITION OF CONJUGATED DIENE RUBBER CONTAINING A NON-REINFORCING FILLER MATERIAL AND A NITROGEN FUNCTIONAL STYRENE-MALEIC ANHYDRIDE RESIN BRIDGING AGENT
Robert C. Strand and Donald L. Marion, Homewood, Ill., assignors to Sinclair Research, Inc., New York, N.Y., a corporation of Delaware
No Drawing. Filed Sept. 12, 1966, Ser. No. 578,458
U.S. Cl. 260—41.5                                  10 Claims
Int. Cl. C08d 9/10; C08c 11/12, 11/18

ABSTRACT OF THE DISCLOSURE

This invention provides rubber compositions comprising a major amount of conjugated diene rubber, a non-reinforcing filler material and a small amount of a diene-soluble, nitrogen-functional styrene-maleic anhydride resin as a bridging agent. This bridging agent is the reaction product of a monoamine, such as octadecylamine, and a polyamine, such as diethylaminopropylamine or tetraethylenepentamine, with a polymer resin of a monovinyl monomer of 2–12 carbon atoms, such as styrene, and maleic anhydride. Only a small amount of the bridging agent is necessary, such as .1 to 5% by weight, to obtain improvement in tensile strength, modulus, and tear strength of the rubber composition.

---

This invention relates to a composition of matter containing non-reinforcing fillers. More particularly, this invention concerns the addition of a nitrogen functional styrene-maleic anhydride resin as a bridging agent for rubbers containing non-reinforcing type fillers.

It is well known in the art that the usefulness of rubber can be broadened by the incorporation of various fillers therein, such as carbon black, talc, clay, calcium carbonate, hydrated silica, etc. Fillers of this type are generally mixed into rubbers to lower their cost and improve or provide special physical properties in the final manufactured article. The physical properties of greatest interest to the rubber technologists which are affected by the addition of fillers are abrasion resistance, tensile strength, modulus and tear strength.

There are two general classes of fillers which can be used in rubber. These are the reinforcing type and the inert or non-reinforcing type fillers. The reinforcing type fillers are those that generally do not require additional special chemicals to develop their reinforcing action, that is, they are reinforcing by themselves. The most widely used self-reinforcing fillers are the carbon blacks which are used extensively in the manufacture of tires and molded goods. The non-reinforcing fillers are generally not self-sustaining and are generally added to rubber to reduce cost or produce a specific working property such as a smooth surface for extruded goods. Examples of the non-reinforcing fillers are talcs, clays, ground limestone and channel blacks. The non-reinforcing fillers suffer from many deficiencies which restrict their use in many applications. For example, these fillers usually degrade physical properties which of course puts definite limitations upon their use. Also, these fillers after vulcanization tend to migrate to the surface or bloom, thus causing further degradation of physical properties.

Because these non-reinforcing type fillers are so inexpensive, there is a strong incentive toward finding ways of maintaining good physical properties in rubbers containing these fillers. Thus, for example, if the blooming tendency of the non-reinforcing fillers can be reduced, the utility of these materials would be greatly increased. Accordingly, there is a need for a method of rendering non-reinforcing type fillers usable in rubber compositions without the attendant disadvantages of degradation to the physical properties of the rubber.

In accordance with the present invention, it has been discovered that certain nitrogen functional derivatives of styrene-maleic anhydride resins when added to rubbers containing non-reinforcing fillers, act as a bridging agent between the filler and the rubber which prevents or reduces the degradation of physical properties in the rubber and in fact is effective in raising the tensile strength and modulus of formation. In addition, the tendency of the filler to bloom is almost completely eliminated. It is theorized that the bridging agent acts as an activator for the rubber's normal bonding and cross-link density studies also support evidence of formulation of a chemical bridge between the filler and elastomer. Thus, by using the nitrogen functional styrene-maleic anhydride resin as a bridging agent, several major disadvantages associated with the use of non-reinforcing fillers can be overcome.

Various synthetic rubber compositions or elastomers that may be adapted to conventional processes for the manufacture of rubber products extended with non-reinforcing filler material may be used in the composition of the present invention. Thus synthetic rubber latices which may be used either individually or as a mixture in polymerized form include as the major component of the composition of this invention those obtained by polymerizing diene hydrocarbons of 4 to 12 carbon atoms, for example, butadiene-1,3-isoprene, 2-phenyl-butadiene-1,3, 2,3-dimethyl-butadiene-1,3, piperylene, cyano-butadiene-1,3, etc. The synthetic rubber latex may also include a mixture of one or more of the dienes listed above with one or more monomers copolymerizable therewith. Suitable copolymerizable monomers can be compounds containing a $CH_2=C<$ group and generally they include such materials as styrene, vinyl naphthalene, alpha-methyl styrene, the alpha-methylene carboxylic acids and their esters, nitrile and amides, such as acrylic acid, methyl acrylate, methyl methacrylate, acrylonitrile, methacrylonitrile, methacrylamide, methyl vinyl ether, methyl vinyl ketone; alpha, beta, and gamma vinyl pyridines, 5-ethyl-2-vinyl pyridine, 2-methyl-5-vinyl pyridine, vinyl carbazole, etc. The preferred synthetic rubber used in the composition of the present invention is a styrene-butadiene polymer. If the diene rubber is copolymerized with a minor amount of an unsaturated monomer of the types described above, these copolymers may often contain incorporated therein about 70 to 80 percent of the conjugated diolefin.

The non-reinforcing, normally solid fillers used in the composition of the present invention include talcs, clays, ground limestone, channel blacks, lime, chalk, magnesia, calcium silicate, aluminum silicate, and many others.

The bridging agent (nitrogen functional resin) added to the composition of the present invention is the reaction product of a monoamine and a poly-amine with a polymer resin of a monovinyl compound of 2 to 12 carbon atoms and maleic anhydride.

The polymer resin of the vinyl compound and maleic anhydride with which the monoamine and polyamine are reacted are resinous polymers having about 1 to 4 moles, preferably about 1 to 3 moles of monovinyl compound per mole of maleic anhydride. Suitable vinyl compounds include, for instance, ethylene, propylene, isobutylene, butylene, pentylene, hexylene, heptylene, octylene, nonylene, decylene, dodecylene, methylvinyl ether, ethyl vinyl ether, butyl vinyl ether, styrene and the like. The preferred vinyl monomer is styrene. If desired, maleic acid can be used instead of maleic anhydride in formation of the polymer resin with the vinyl monomer.

The resinous polymer reactant of the invention contains repeating vinyl compound-maleic anhydride units and preferably has an average molecular weight of at least about 400 to about 100,000 and can be higher as long as the high molecular weight polymer is soluble or dispersible in the rubber. The preferred average molecular weight is about 400 to 10,000. The melting points of the lower molecular weight polymers, will generally range from about 80 to 300° C. as determined by the Fisher-Johns Melting Point Apparatus. The determination of average molecular weight as used herein is made by the Thermoelectric Differential Vapor Pressure Lowering method on a Mechrolab Osmometer. The polymer of the vinyl monomer and maleic anhydride can be prepared by known methods. A preferred method is by solution polymerization where the monomers are polymerized in a suitable solvent employing as a polymerization catalyst a free-radical peroxide catalyst, preferably benzoyl peroxide or dicumyl peroxide, at a temperature of about 75 to 300° C. or more. Suitable solvents include the aromatic hydrocarbon solvents, such as cumene, p-cymene, xylene, toluene, etc. The aromatic solvents may serve as chain-terminating solvents and give lower molecular weight products. Other suitable solvents are the ketones, such as methylethyl ketone, which may also be chain-terminating solvents. The preferred manner of carrying out the polymerization is by incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization, the formation of the polymers causes a heterogeneous system, the polymer layer being the heavier layer and recoverable by merely decanting the upper aromatic solvent layer and drying. On the other hand, when a ketone is the solvent, the formed polymer is usually soluble in the solvent media so that recovery of the products necessitates a solvent-stripping operation.

The monoamine reactant which can be used in producing the bridging agent is a monoamine having the formula:

wherein R is a monovalent hydrocarbon radical preferably alkyl, of up to 1000 carbon atoms or more, preferably 5 to 25 carbon atoms, and R' is R or hydrogen. Advantageously at least one R has at least 5 carbon atoms. R can be straight or branch chained, saturated or unsaturated, aliphatic or aromatic and is preferably saturated. The preferred monoamines are the primary monoamines. Examples of suitable monoamines are 2-ethylhexylamine, n-octyl amine, decyl amine, octadecyl amine, stearyl amine, lauryl amine, N-methylstearyl amine, N-ethyloctadecyl amine, N-butyllauryl amine, and the like or mixtures thereof. The monoamine can also be substituted with groups which do not interfere with the reaction of the amino group of the amine with the anhydride or acid moiety of the resinous vinyl compound-maleic anhydride copolymer and do not otherwise unduly deleteriously affect the desired properties of the final reaction product. Illustrative of non-interfering groups are carboxyl, halo-, nitro-, etc. groups.

The polyamine reactant which can be used in forming the bridging agent is represented by the general formula:

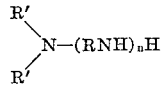

wherein R is an alkylene radical of 2 to about 25 carbon atoms, preferably 2 to 4 carbon atoms, R' is selected from H and a hydrocarbon radical, preferably alkyl, of 1 to about 25 carbon atoms and $n$ is about 1 to 10,000, more commonly 2 to 10.

These polyamines include monoalkylene diamines, dialkylaminoalkylamines and the polyalkylenepolyamines. Illustrative of suitable monoalkylene diamines are ethylene diamine, propylene butylene diamine, octylene diamine, etc. Examples of suitable dialkylaminoalkylamines are dimethylaminomethylamine, dimethylaminoethylamine, dimethylaminopropylamine, dimethylaminobutylamine, diethylaminopropylamine, diethylaminoamylamine, dipropylaminopropylamine, methylpropylaminoamylamine, propylbutylaminoethylamine, etc. Non-limiting examples of the polyalkylenepolyamine reactants are diethylenetriamine; triethylenetetramine; tetraethylenepentamine; polyethyleneamine; di-(methylethylene) tri-amine; hexapropyleneheptamine; tri(ethylethylene) tetramine; penta-(1 - methylpropylene)-hexamine; tetrabutylenepentamine; etc.

The bridging agent of the invention can be prepared by simply heating at elevated temperature about 0.1 to 2 moles of the total monoamine and polyamine per average anhydride unit as one carboxyl group per mole of the vinyl compound-maleic anhydride polymer. The mole ratio of monoamine to polyamine is generally about 0.1 to 10.1 preferably about 0.1 to 1.1. A temperature of about 125° C. is usually necessary to effect the reaction and temperatures beyond about 350° C. are generally not utilized in that they may cause undesirable side reactions or degradation of the product. The preferred reaction temperatures are about 190 to 280° C. The reaction may be carried out in bulk or in the presence of a suitable mutual solvent for the reactants including the synthetic rubber in which the reaction product is to be employed. Although the monoamine and polyamine can be combined and reacted simultaneously with the styrene-maleic anhydride polymer, it is preferred to react one with the polymer until the reaction is substantially complete and then the other, preferably by incremental addition. The total reaction time will vary depending upon the particular reactants employed but will usually range from about 1 to 5 hours up to several days if necessary.

The rubber usually contains about 50–150 parts per hundred of elastomer of the non-reinforcing filler, based on the weight of the total composition with about 75 to 125 parts per hundred of the filler being preferred. Only a small amount of the nitrogen functional bridging agent is necessary to achieve the improvement in tensile strength, modulus and tear strength. The addition of about 0.1 to 5 parts per hundred of the bridging agent has been found to be effective, with about 1 to 3 parts per hundred being preferred.

Examples I and II illustrate the preparation of a bridging agent used in the composition of the present invention.

Example I.—Preparation of mixed octadecylamine-diethylaminopropyl amine derivative of styrene-maleic anhydride resin Into a 1 liter resin kettle, equipped with stirrer, nitrogen inlet, tube, thermometer, reflux condenser equipped with a Dean-Stark trap, was placed 1 mole of styrene-maleic anhydride resin (202 gms.), having a molecular weight in the range of 1600–1800 and a styrene-maleic anhydride mole ratio of 1:1, and 225 gms. (0.75 mole) of a commercial $C_{18}$ fatty amine, e.g. octadecyl amine. The mixture was heated to 210° C. until the imidization reaction started; then, 32.5 grams (0.25 mole) of diethylaminopropylamine was added dropwise from a dropping funnel over a period of 10 minutes. The reaction was continued until the water of reaction ceased to distill from the mixture. The total reaction time was approximately three hours at 210° C. The product obtained was a greenish-brown solid which was soluble in synthetic rubber in all proportions. The product showed an acid number at pH 11 of 0.58; base number at pH 4 of 24.7; percent N, 3.09 (theory percent N, 3.1).

Example II.—Preparation of mixed octadecylamine and tetraethylenepentamine derivative of styrene-maleic anhydride resin Into a one liter resin kettle equipped as previously described was placed 202 gms. (1 mole) of styrene-maleic anhydride resin having a molecular weight of 600–750 and a styrene-maleic anhydride mole ratio of 1:1, and 202 gms. (0.75 mole) of octadecylamine. The mixture was heated to 210° C. until the water of reaction commenced to collect in the Dean-Stark trap, at which time 47.2 gms. (0.25 mole) of tetraethylenepentamine was added dropwise over a period of ten minutes. The mixture was heated an additional 3 hours at 210° C. The product was light, yellow colored, viscous liquid, which was completely soluble in synthetic rubbers.

The following examples illustrate the improvement achieved in the tensile strength and the modulus by the addition of a nitrogen functional styrene-maleic anhydride resin bridging agent to styrene-butadiene rubber containing a non-reinforcing filler. As can be readily seen the tensile strength was improved about 250 to 500% and the modulus was improved more than 100%.

EXAMPLE III

|  | Parts by Weight |  |
| --- | --- | --- |
| Philprene SBR 1500 [1] | 50.0 | 5.0 |
| Mistron Vapor [2] | 37.5 | 37.5 |
| Zinc Oxide | 2.5 | 2.5 |
| Stearic Acid | 0.5 | 0.5 |
| Agerite Alba [3] | 0.5 | 0.5 |
| Styrene-maleic anhydride imine of Ex. |  | 1.0 |
| Sulfur | 1.5 | 1.5 |
| Altax [4] | 0.25 | 0.25 |
| Cure Cycle: 90 Minutes at 280° F. |  |  |
| Percent Elongation | [5] 1,910 | [5] 1,570 |
| Tensile Strength (lbs./in.²) | 324 | 1,640 |
| 300% Modulus (lbs./in.²) | 204 | 530 |
| Shore A-2 Hardness | 58 | 68 |
| Percent Tension Set | 287 | 167 |

[1] Styrene-butadiene rubber, 23.5 wt. percent bound styrene, Mooney viscosity of 50.
[2] Fine particle size talc pigment with an index of refraction of 1.59, a specific gravity of 2.75, and a particle size of about 0.25 to 6 microns.
[3] Hydroquinone monobenzyl ether.
[4] Benzothiazyl disulfide.
[5] Rupture of the specimen did not occur.

EXAMPLE IV

|  | Parts by Weight |  |
| --- | --- | --- |
| Goodyear SBR 1006 [1] | 50.0 | 50.0 |
| Mistron Monomix [2] | 37.5 | 37.5 |
| Zinc Oxide | 2.5 | 2.5 |
| Stearic Acid | 0.5 | 0.5 |
| Agerite Alba | 0.5 | 0.5 |
| Styrene-maleic anhydride imine of Ex. |  | 1.0 |
| Sulfur | 1.5 | 1.5 |
| Altax | 0.25 | 0.25 |
| Cure Cycle: 90 Minutes at 280° F. |  |  |
| Percent Elongation | 1,033 | 953 |
| Tensile Strength (lbs./in.²) | 439 | 1,105 |
| 300% Modulus (lbs./in.²) | 220 | 486 |
| Shore A-2 Hardness | 58 | 71 |
| Percent Tension Set | 140 | 140 |

For footnotes 1 and 2, see Example III.

It is claimed:
1. A rubber composition comprising a major amount of a 4 to 12 carbon atom conjugated diene rubber, a non-reinforcing filler material and a small amount, effective to improve tensile strength, of the diene-soluble reaction product of:
(A) Monoamine having the formula

wherein R is monovalent hydrocarbon of up to about 1000 carbon atoms and R' is selected from the group consisting of R and hydrogen;

(B) Polyamine having the formula

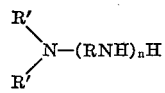

wherein R is alkylene of 2 to 25 carbon atoms, R' is selected from the group consisting of H and hydrocarbon of 1 to about 25 carbons, and $n$ is a number of 1 to 10,000 and
(C) Polymer resin of a monovinyl monomer of 2 to 12 carbon atoms and maleic anhydride in a mole ratio of monovinyl monomer to maleic anhydride of about 1 to 4:1, A and B being present in a total amount of about 0.1 to 2 moles per anhydride unit in C, the molar ratio of A:B being about 0.1 to 10:1 and the amount of said reaction product being sufficient to provide said rubber-filler mixture with improved tensile strength.

2. The composition of claim 1 wherein the amount of the reaction product is about 0.1 to 5 parts per hundred parts of the rubber.

3. The composition of claim 1 wherein the non-reinforcing filler material is present in an amount of about 50–150 parts per hundred parts of the rubber.

4. The composition of claim 1 wherein the polymer resin C is a polymer of styrene-maleic anhydride and has an average molecular weight of about 400 to 10,000.

5. The composition of claim 1 wherein the reaction product is of:
(A) octadecylamine,
(B) diethylaminopropylamine, and
(C) polymer resin of styrene and maleic anhydride.

6. The composition of claim 1 wherein the reaction product is of:
(A) octadecylamine,
(B) diethylene triamine, and
(C) polymer resin of styrene and maleic anhydride.

7. The composition of claim 1 wherein the reaction product is of:
(A) hexadecylamine,
(B) tetraethylenepentamine, and
(C) polymer resin of styrene and maleic anhydride.

8. The composition of claim 1 wherein the reaction product is of:
(A) octadecylamine,
(B) tetraethylenepentamine, and
(C) polymer resin of styrene and maleic anhydride.

9. A rubber composition of improved tensile strength and modulus with a reduced amount of filler bloom comprising a major amount of a conjugated diene rubber, about 75–125 parts of a non-reinforcing type filler per one hundred parts of the rubber and about 1 to 3 parts of the diene-soluble reaction product of claim 1 per one hundred parts of the rubber.

10. The composition of claim 9 wherein the conjugated diene polymer is a styrene butadiene copolymer and the non-reinforcing type filler is talc.

References Cited

UNITED STATES PATENTS 3,224,998  12/1965  Kirkconnell _____ 260—41.5
3,256,233  6/1966  Hahn et al. _____ 260—887

FOREIGN PATENTS 648,753  9/1962  Canada.

MORRIS LIEBMAN, *Primary Examiner.*
S. L. FOX, *Assistant Examiner.*

U.S. Cl. X.R.

260—892, 889